H. Mellish.
Making Wooden Bowls.
Nº 73740. Patented Jan. 28, 1868.
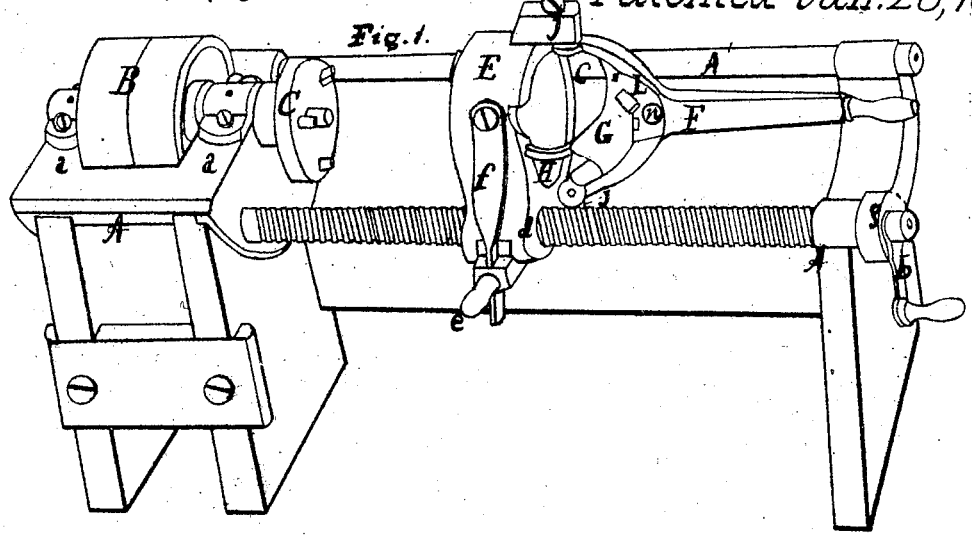
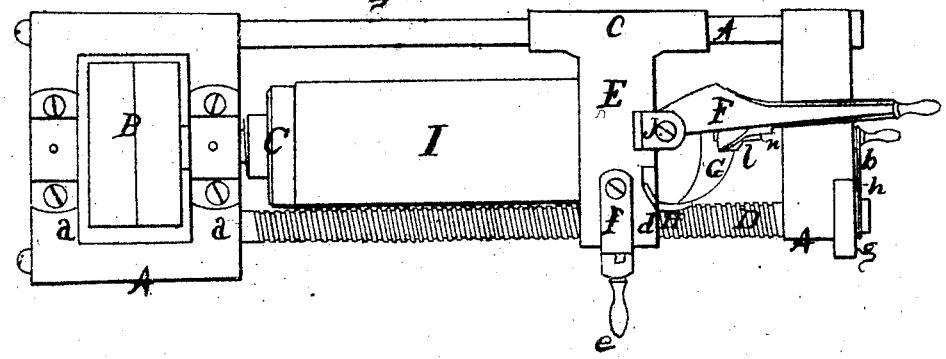
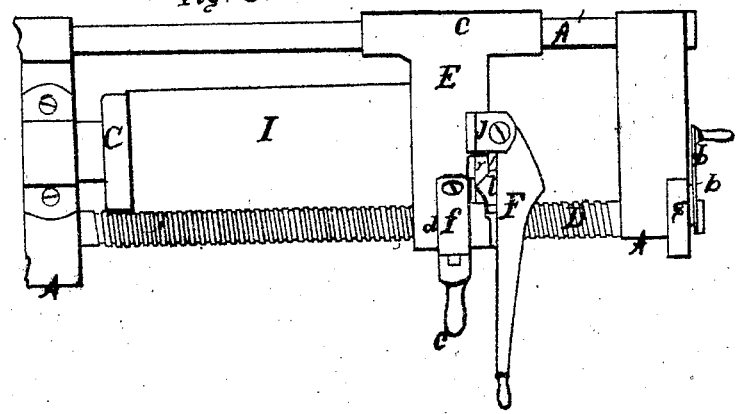
Witnesses.
B. F. Aldrich.
Frederick Foss.
Inventor.
Henry Mellish Sheet.2 2.Sheets.
H. Mellish.
Making Wooden Bowls
№ 73740.  Patented Jan. 28, 1868.
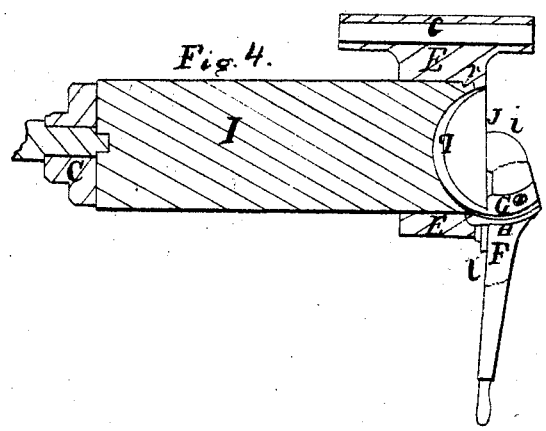
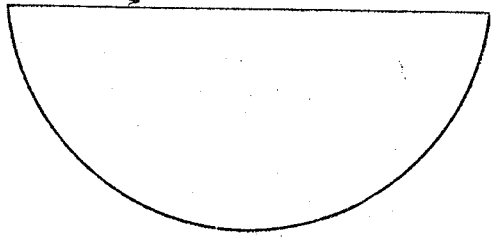
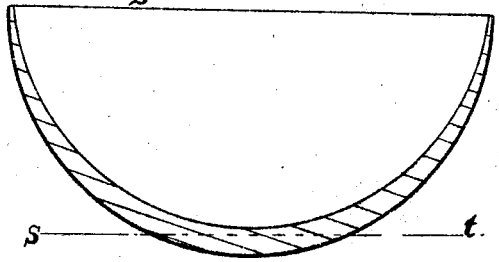
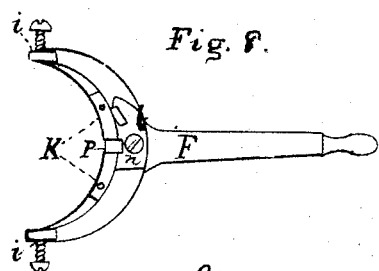
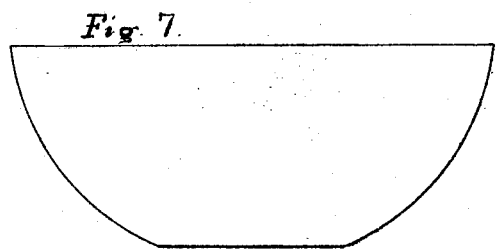
Witnesses.
B. F. Aldrich.
Frederick Foss
Inventor.
Henry Mellish

United States Patent Office.

HENRY MELLISH, OF WALPOLE, NEW HAMPSHIRE.

Letters Patent No. 73,740, dated January 28, 1868.

IMPROVEMENT IN MACHINES FOR MAKING WOODEN BOWLS.

*The Schedule referred to in these Letters Patent and making part of the same.*

TO ALL WHOM IT MAY CONCERN:

Be it known that I, HENRY MELLISH, of Walpole, in the county of Cheshire, and State of New Hampshire, have invented certain new and useful Improvements in Machines for Cutting Fruit-Bowls from the end of a cylinder of timber; and I do hereby declare that the following is a full and exact description thereof.

My invention consists in providing a hollow cylinder to receive and guide one end of a suitably-prepared revolving cylinder of timber, one end of the hollow cylinder having hinged to it the arms of a bifurcated lever, with cutters of suitable form attached between its arms, so that after making a cavity in the end of the cylinder of timber, in the form of the inside of the bowl to be cut, each proper vibration of the lever will produce a bowl nearly hemispherical in form, both at its inner and outer surfaces.

Similar letters of reference indicate corresponding parts in all the figures accompanying this specification.

Figure 1 is a perspective view of the machine.

Figure 2 is a plan view of the machine, with a cylinder of timber in place ready for operation.

Figure 3 is a plan view of the machine, with a cylinder of timber in place as it is when a bowl has just been cut.

Figure 4 is a horizontal sectional view of the cylinder of timber, cutters, lever, and guiding-cylinder for guiding the timber.

Figure 5 is a bowl as it falls from the machine.

Figure 6 is a vertical sectional view of a bowl as it falls from the machine, showing its variation of thickness from top to bottom.

Figure 7 is a side view of a bowl finished by cutting away a portion of its thickness to make a flat surface for its bottom.

Figure 8 is a side view of the lever, with the cutter for trimming the top of the bowl attached to it.

Figure 9 is the main cutter detached from the lever.

In fig. 1, A A and A' constitute the frame of the machine, B the driving-pulleys on an arbor with the face-plate C, which turns in bearings in the cross-rails $a$ $a$ of the frame. The screw D is arranged to turn between the heads A A of the frame of the machine, by means of the crank $b$. E, a hollow guiding-cylinder to receive and support the timber from which the bowls are cut, and $c$ is a tube connected with it to slide on the way A' of the frame. The screw D passes through the prominence $d$ on the guiding-cylinder, and serves the purpose of a way, and with its crank $b$, and the index-plate $g$, to move along and set the cylinder E preparatory to cutting each bowl. The lever $e$ has its opposite end hinged to a prominence on the under side of the guiding-cylinder E, and has on its upper surface half a female-screw box fitting on to the screw D, where it is held firmly in place by the spring-catch $f$ passing down through it, so that the cylinder E may be moved along its ways by turning the crank $b$ of the screw D, and may be made stationary, by inserting the pin $h$, projecting from the lever of the crank $b$ into a hole in the index-plate $g$, where it is held firmly during the operation of cutting a bowl. To the ears J of the guiding-cylinder E, the arms of a bifurcated lever, F, are hinged with the screws or pivots $i$, and between the arms of this lever the main cutter G is made fast in the recess $k$ (see fig. 8) with the screws $m$ $m$, (see fig. 9.) The main cutter is concavo-convex, and is curved to correspond to the size and form of the bowls to be cut. The form of the cutter may be as represented in the different positions in the figs. 1, 2, and 9, or its form may be varied by making it wider at its cutting-point, so as to give it a drawing cut and greater strength, to avoid springing when cutting the thicker bowls, or the harder kinds of timber, but still retaining its globular or concavo-convex form or curve, or its curve to correspond to the size and form of the bowls to be cut. The form of the cutter is represented in different positions in the figs. 1, 2, and 9. To the lever F a V-shaped cutter, $l$, is attached, with the screw $n$ in position as represented, with its cutting-edge standing a sufficient distance back or away from the main cutter to admit the upper edge of a bowl between it and the main cutter. In the branch of the lever F a groove, P, is provided, to form an opening between the lever and the main cutter, to admit the guide H, (see sectional view, fig. 4.) This guide H is an arm projecting from the cylinder E, and is curved to correspond with the curve and sweep of the main cutter, and serves the purpose of guiding its point so as to enter the timber at all times alike.

Operation.

Having prepared a cylinder of timber to fit easily into the guiding-cylinder E, by thoroughly steaming it, place it in the machine, as represented at I, in fig. 2, with one end of the timber so far in the guiding-cylinder that when the lever F is pulled forward, as represented in fig. 3, the point of the main cutter G will come in contact with the end of the timber before reaching the axis of the cylinder of timber. Now, apply power to the driving-pulley B, to revolve the cylinder of timber, then pull forward the lever F, as represented in fig. 3, and it will be seen that the main cutter G will have cut a cavity in the end of the cylinder of timber I, corresponding to the curve and sweep of the cutter. Now, the lever F should be swung back, as seen at figs. 1 and 2, and a turn given to the screw D, by turning the crank b and setting it by inserting the pin h in a hole in the index-plate g. Then by pulling forward the lever, as above described, another chip will be cut from the end of the timber to enlarge its cavity. After repeating the above operation, to enlarge the cavity in the end of the timber to the size of its circumference, the same operation being continued, will then produce bowls or hemispherical cuts. A side view of which, see fig. 5.

The operation of cutting will be more fully understood by reference to fig. 2, showing the revolving cylinder of timber I in the machine, with the point of the main cutter G resting against the guide H, ready to cut a bowl. Now, it will be seen that by sweeping the lever F steadily to the position as seen in fig. 3, the point of the main cutter will have swept through its quarter of a circle to the axis of the revolving timber, and separated a bowl, q, from it, as shown in sectional view, fig. 4, and at the same time the V-shaped cutter l will have cut the channel r for the purpose of giving a finish to the top of the next bowl to be cut, and for the point of the main cutter to enter at the next operation of cutting a bowl, (see r, fig. 3.) Fig. 5 is a side view of a bowl as it falls from the machine. Fig. 6 is a vertical section of a bowl as it falls from the machine, showing its thickness in all its parts, and also showing by the line s t the point at which a piece is separated to form a bottom and to finish the bowl, as shown by fig. 7.

What I claim as my invention, and desire to secure by Letters Patent, is as follows:

1. I claim the hollow cylinder E, when constructed with the cutter-guide H, or its equivalent, substantially in the manner and for the purpose above described.

2. I claim the concavo-convex cutter G, when arranged in combination with the cylinder E to swing in a circle corresponding to its curve, substantially in the manner and for the purpose above described.

3. I claim the cutter l, when constructed and arranged to operate with the cutter G and lever F, or its equivalent, substantially as and for the purpose above specified.

HENRY MELLISH.

Witnesses:
 B. F. ALDRICH,
 FREDERICK VOSE.